United States Patent

Cripe

[15] 3,661,174
[45] May 9, 1972

[54] CHECK VALVE WITH MEANS FOR RELIEVING FLUID PRESSURE FROM THE CONTROL CHAMBER

[72] Inventor: Maxwell L. Cripe, South Bend, Ind.
[73] Assignee: The Bendix Corporation
[22] Filed: Aug. 5, 1970
[21] Appl. No.: 62,238

[52] U.S. Cl..........................................137/512.3, 137/519.5
[51] Int. Cl........................................................F16k 15/14
[58] Field of Search...................137/103, 107, 512.3, 519.5, 137/539.5

[56] References Cited

UNITED STATES PATENTS

| 3,228,418 | 1/1966 | Rosback et al.......................137/525 X |
| 3,466,819 | 9/1969 | Giger...............................137/519.5 X |
| 1,260,005 | 3/1918 | McDonald et al....................137/512.3 |
| 3,559,678 | 2/1971 | Donner..............................137/539.5 X |
| 1,860,163 | 5/1932 | Wyzenbeek..........................137/512.3 |
| 3,012,623 | 12/1961 | Powers..............................137/519.5 X |
| 1,944,249 | 1/1934 | Lencke..............................137/512.3 |
| 2,341,758 | 2/1944 | Carpenter............................137/107 |

*Primary Examiner*—Samuel B. Rothberg
*Assistant Examiner*—David J. Zobkiw
*Attorney*—William N. Antonis and Plante, Hartz, Smith and Thompson

[57] ABSTRACT

A check valve for a power braking system having a housing containing a flexible member in a control chamber. The flexible member overlies an inlet to the system and permits fluid flow only from the system to the control chamber. An outlet port is connected to the vacuum of the manifold of an automobile. A tubular projection adjacent an opening in the control chamber contains a ball member which is loosely held in position by a pin member in the projection. The loosely held ball member will permit present at the manifold resulting from the operation of the car and carried to the control chamber to escape to the atmosphere around the ball without damaging the system.

1 Claim, 3 Drawing Figures

PATENTED MAY 9 1972
3,661,174
INVENTOR.
MAXWELL L. CRIPE
BY Plante, Hartz, Smith
& Thompson
ATTORNEYS
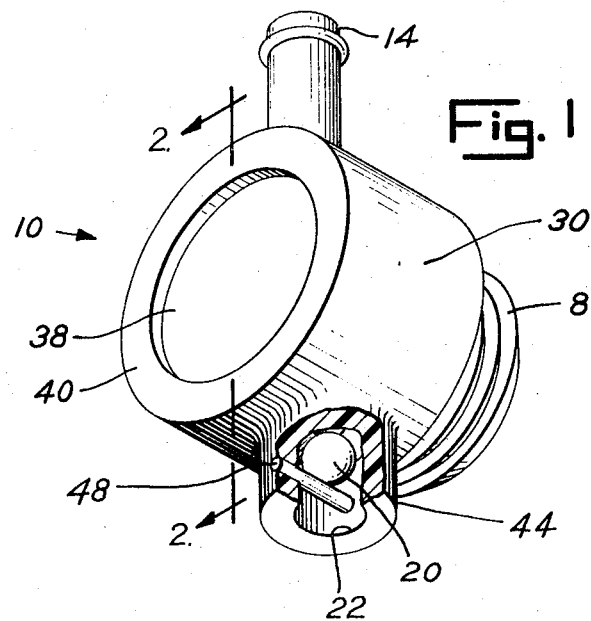
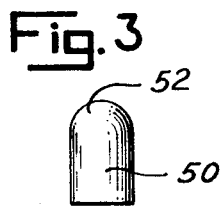
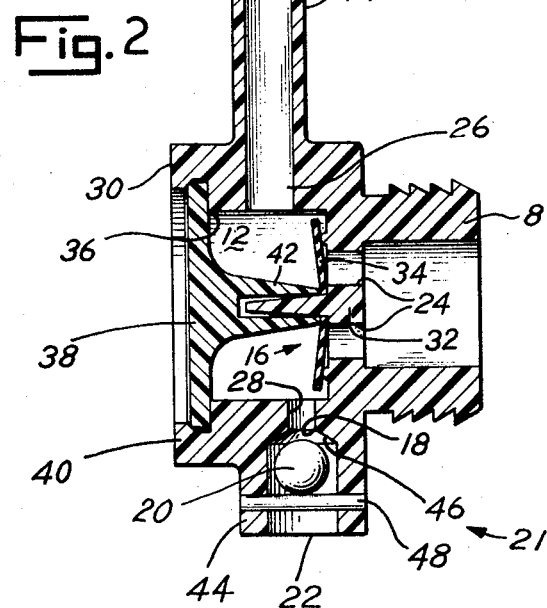

CHECK VALVE WITH MEANS FOR RELIEVING FLUID PRESSURE FROM THE CONTROL CHAMBER

BACKGROUND OF THE INVENTION

In modern cars because of the Federal Highway Safety Standard Requirements, all engines are required to be equipped with air pollution controls. In tuning such an engine to operate at a level of efficiency and because its added components such as air conditioning, the temperature under the hood has risen quite considerably in the past years. This is especially noticed upon restarting an automobile which has been stopped, because the cooling system does not operate to carry any of the heat away. If the valves of the vehicle are not tuned properly, with this increase in under the hood temperature, it is possible that the engine may backfire through the manifold causing a high internal back pressure to the vacuum system. If the backfire does not occur, gas fumes which are present in the manifold may be carried to the check valve where they will remain and condense. Now, if a backfire occurs in addition to the possible rupture of the check valve itself, we have the additional disadvantage of a fire hazard.

In U.S. application Ser. No. 29,570, filed Apr. 17, 1970, owned by the common assignee of this invention and incorporated herein by reference, the rupturing of the vacuum check valve has been prevented by adding the cap member to the stem which holds a flexible plate for sealing the system. This flexible plate member will allow any backfire pressure to be released through it to the atmosphere instead of rupturing the check valve itself.

SUMMARY OF THE INVENTION

In the present invention in order to prevent the possibility of rupturing the vacuum supply line and also to relieve any condensation of gas which may be present in the control chamber, means have been provided to allow the fluid to flow to the atmosphere. This is accomplished by having closure means made of an inert material being placed adjacent an opening to the control chamber. The closure means will respond to vacuum in the system to close the opening and permit the vacuum to operate the check valve which in turn operates a power braking unit. Thus, we have provided a means whereby internal damage to the check valve from unwanted fluid will be prevented.

It is therefore the object of this invention to provide means for relieving fluid condensation and backflow pressure from the control chamber of a check valve and thereby prevent internal damage.

It is another object of this invention to provide a closure means which will allow the backflow pressure to be freely transmitted to the atmosphere and yet to have the closure means being fully responsive to vacuum to seal the control chamber permitting the check valve to operate in the braking system.

It is another object of this invention to provide means whereby drainage of fluid condensation collected in the control chamber will take place each time the vacuum from the manifold has ceased to operate.

These and other objects will become readily apparent to those who read the specification and view the drawings in this apparatus.

BRIEF DESCRIPTION OF THE DRAWINGS

FIG. 1 is a perspective view of the check valve constructed in accordance with the principles of the present invention.

FIG. 2 is an enlarged sectional view cut along lines 2—2 of FIG. 1.

FIG. 3 is a side view of a cylindrical closure member for the check valve made in accordance to the principles of my invention.

DETAILED DESCRIPTION OF THE PREFERRED EMBODIMENT

In the preferred embodiment of the check valve 10, shown in FIGS. 1 and 2, a control chamber 12 is connected to a system by conduit 8 and a source of vacuum by conduit 14. Valve means 16 permits fluid to flow from the system to the control chamber 12 in response to vacuum in the engine manifold (which is not shown) but not in reverse. When the engine is stopped, gas fumes from the valve of the engine can be transmitted through the manifold through conduit 14 and condense in chamber 12. When fumes are condensed into droplet size, it is possible for them to pass through opening 18, around ball means 20, and through the atmospheric opening 22. Now upon starting the engine of the car if a backfire should occur, this high internal back pressure will be transmitted through opening 22 to the atmosphere without damage to the valve means 16. Thus, with this type of check valve 10, the possibility of rupture and a subsequent fire by a backfire is reduced and damage to the vacuum system of the power braking unit can be prevented.

In more particular detail, the check valve 10 consists of a housing 30 having a control chamber 12, a plurality of inlet ports 24, an output port 26 and an opening to the atmosphere 28. The inlet ports 24 are radially spaced around a stem 32 which is integrally formed with the housing 30 and carries a flexible plate member 34. An opening 36 in the housing 30 for inserting a flexible plate 34 into chamber 12 has a shoulder 40 or hoops around it for securing a projection member 42 in proper location over the flexible plate member 34 to prevent backflow from the control chamber 12 to the system through the inlet ports 24.

Surrounding the opening to the atmosphere is a closure member 21 having a tubular projection 44 for holding a ball means 20 loosely in the tubular projection. A pin 48 will retain the ball means 20 in the tubular projection when the vacuum ceases to operate or hold the ball against the seat 46 of the opening 18. The ball means 20 will be constructed of a material inert to petroleum fumes.

MODE OF OPERATION OF THE PREFERRED EMBODIMENT

With the engine of the vehicle running, vacuum produced in the manifold will draw air from the system by unseating valve means 16 and at the same time will seat the flexible ball means 20 against the seat 46 of the opening to the control chamber 12 thereby preventing access of atmospheric pressure to the control chamber 12. With the check valve 10 now having a closed chamber, vacuum will be transmitted to operate the power booster of the braking system.

In the absence of vacuum being produced at a source when the engine is stopped, the ball means 20 will unseat from opening 18 due to its weight. Ball means 20 will drop in tubular projection 44 until it rests against the pin member 48, as shown in FIG. 2. Any fumes which are received in the control chamber 12 after stopping the engine can condense and readily pass through opening 18 go around ball means 20 to harmlessly escape through opening 22 into the atmosphere.

Upon starting the engine, if a backfire should occur creating a high internal back pressure at the manifold, conduit 14 will carry the back pressure to control chamber 12. This back pressure effectively passes through opening 28, past ball 20, and into the atmosphere without internally damaging the valve means 16. Thus, I have provided a check valve with the means for effectively preventing fumes, which have collected in the conduit 14 coming from the manifold, from reaching the power braking unit and have thereby reduced the possibility of a fire if a backfire should occur.

The shape of the ball means 20 in FIG. 2 could be constructed as a cylindrical member 50 with a spherical shape 52 on top, as shown in FIG. 3. The cylindrical member 50 guides or aligns the spherical top 52 into seating against seat 46 of opening 18 for sealing the control chamber 12.

In the event that the ball means 20 or the spherical top 52 of the cylindrical member 50 does not seat on seat 46 to seal control chamber 12, the vacuum from the manifold will still be large enough to unseat flexible valve means 16 to operate the power brakes since the relative size of opening 18 to the inlet 24 is measurably less. But the diameter of the opening 18 from the control chamber 12 must be large enough to permit the droplets of condensation to pass therethrough without forming a surface tension and effectively sealing the opening 18. The space between the wall of the tubular projection 44 and the closure member 50 must be sufficiently large to prevent surface tension from sealing the space between the closure member 21 and the wall of the tubular member 44 and yet, must be small enough to create a sufficient draw from the vacuum to bring the closure member 21 in a seating arrangement with the opening 18.

I claim:

1. A check valve for use in a vacuum operated power braking system to relieve fluid condensation created by petroleum fumes from the manifold of a vehicle comprising:

a housing having a control chamber with an inlet port connected to the braking system, a first outlet port connected to the manifold where a partial vacuum can be created and a second outlet port connected to the atmosphere;

flexible means located in the control chamber overlying said inlet port and adapted to be seated on the housing surrounding said inlet port when said partial vacuum has evacuated said braking system of air, said flexible means upon seating on said housing preventing said petroleum fumes from entering said braking system;

a tubular projection surrounding said second outlet port;

cylindrical means having a spherical head loosely located in the interior of said tubular projection; and pin means for retaining said cylindrical means in said tubular projection, said cylindrical means engaging the interior of said tubular projection to align said spherical head with said second outlet port, said cylindrical means moving in response to said partial vacuum to seat said spherical head on the housing surrounding said second outlet port and allow said partial vacuum to evacuate air from said inlet port through said first outlet port, said petroleum fumes and condensation resulting therefrom passing between the interior of the tubular projection and the cylindrical means to harmlessly escape through the second outlet port without damaging said flexible means when partial vacuum is absent at the manifold.

* * * * *